United States Patent

[11] 3,578,819

| | | | |
|---|---|---|---|
| [72] | Inventor | Thomas M. Atkins | |
| | | Ann Arbor, Mich. | |
| [21] | Appl. No. | 761,709 | |
| [22] | Filed | Sept. 23, 1968 | |
| [45] | Patented | May 18, 1971 | |
| [73] | Assignee | Kelsey-Hayes Company | |
| | | Romulus, Mich. | |

[54] SKID CONTROL SYSTEM
31 Claims, 6 Drawing Figs.

[52] U.S. Cl. ................................................... 303/21,
188/181
[51] Int. Cl. ........................................... B60t 8/08
[50] Field of Search .......................................... 303/6, 21,
61—63, 68, 69; 188/181

[56] References Cited
UNITED STATES PATENTS

| | | | | |
|---|---|---|---|---|
| 2,937,051 | 5/1960 | Highley | | 303/21 |
| 3,235,036 | 2/1966 | Meyer et al. | | 303/21X |
| 3,362,757 | 1/1968 | Marcheron | | 303/21 |
| 3,365,244 | 1/1968 | Mueller | | 303/21 |
| 3,382,012 | 5/1968 | Lucien | | 303/21 |

Primary Examiner—George E. A. Halvosa
Assistant Examiner—John J. McLaughlin
Attorney—Harness, Dickey & Pierce

ABSTRACT: A skid control system for fluid-actuated brakes of a wheeled vehicle including a modulating valve for modulating the fluid pressure to the fluid-actuated brakes and a control circuit for controlling the valve in response to indications of wheel speed and/or wheel deceleration.

FIG. 1.

FIG. 4A.
Uncontrolled Wheel Departure

FIG. 4B.
Controlled Wheel Departure

INVENTOR.
Thomas M. Atkins
BY Harness, Dickey & Pierce
ATTORNEYS

SKID CONTROL SYSTEM

SUMMARY BACKGROUND OF THE INVENTION

The present invention relates to skid control systems and more particularly relates to a skid control system including a novel control circuit.

It is an object of the present invention to provide a novel skid control system for controlling the brakes of the wheels of a wheeled vehicle.

It is another object of the present invention to provide a novel skid control system for fluid-actuated brakes for wheels of a wheeled vehicle including a novel control circuit for actuating a modulating valve for modulating or controlling the pressure to the brakes in response to an electrical signal indicating the occurrence of the imminence of a wheel skid condition.

In the system of the present invention the modulating valve is actuated in response to an electrical signal indicating the occurrence of a preselected deceleration rate; in order to accommodate different surface conditions and to enhance braking operation, operational characteristics are varied depending upon the surface condition which is sensed by sensing a spin-up time characteristic of the wheels being controlled during the time of brake relief. In addition, the time duration that the valve is operative to relieve pressure at the brakes of the controlled wheels is varied with road conditions and vehicle speed.

In the system of the present invention a vehicle speed analogue is provided which during each brake relief senses the linear velocity of the vehicle by sensing the velocity attained by the controlled wheels. This information is stored and is used for the next cycle to vary the time at which the brakes are reapplied in accordance with velocity. This provides for better braking operation. The sensed velocity signal is allowed to change with time during each cycle at a preselected rate such that at any time an analogue-approximating vehicle speed will be had.

Two separate means are provided for determining when the brakes are to be reapplied. One means senses wheel spin-up and is actuated at high spin rates indicating high $\mu$ surfaces; the analogue is used to effect this occurrence with velocity such that at higher velocities the wheels can spin up more. The second means senses vehicle deceleration and reapplies the brakes after a determinable interval. This latter means is designed to be sensitive to low $\mu$ surfaces; in addition, the time for reapplying the brakes is increased with velocity in accordance with the velocity analogue. The sensed velocity signal from the velocity analogue is also used to affect the brake release time.

It is known that to optimize braking the degree or magnitude of wheel departure should be controlled. "Wheel departure" is generally the difference between vehicle speed and wheel speed, i.e., an indication of slip. In cyclic skid control it is desirable that on brake application the wheel, prior to brake release, be decelerated to a speed which is not excessively low compared to vehicle speed since if this occurs then the tendency for the wheel to become locked increases; in addition, it is desirable, on brake release, that the wheel be accelerated, prior to brake reapplication, to a speed less than vehicle speed since if the wheel attains vehicle speed then stopping distance is increased. In the system of the present invention brake release and reapplication times are controlled to provide a desired wheel departure characteristic and to enhance vehicle braking.

When the system is used to control two wheels in unison, means are utilized to compensate for wheel brake unbalance which could permit one wheel to decelerate faster than the other, etc. Unless some compensation were provided a situation could occur in which one wheel was near vehicle speed while the other was in substantial slip; in such a condition most of the braking would be caused by only one wheel resulting in inefficient braking. To prevent this in the present system means are provided requiring the wheels to reach a minimum selected velocity before relief of the brakes. In the present system this minimum wheel velocity is varied as a function of vehicle velocity; this is in line with the prior discussion regarding optimizing the wheel departure characteristic. All of the above-noted features contribute to an improved system and enhance the stability of the vehicle.

Therefore, it is another object of the present invention to provide a skid control system including one or more of the above-noted features.

It is another object to provide a skid control system in which the wheel departure is optimized.

It is another object to provide a system in which wheel departure is optimized as a function of vehicle velocity.

Other objects, features and advantages of the present invention will become apparent from the subsequent description and the appended claims, taken in conjunction with the accompanying drawings, in which:

The skid control system of the present invention can be utilized and will be described specifically for use with an automotive vehicle; however, it should be understood that the features of the invention could be utilized with other types of wheeled vehicles including aircraft. For an automotive vehicle, the system of the present invention can be utilized in connection either with the front wheels, the rear wheels or the front and rear wheels. The system will be described for use in conjunction only with the rear wheels of an automotive vehicle. The system of the present invention is generally of the type shown and described in the U.S. Pat. to Every et al., No. 3,515,440 issued June 2, 1970 and that disclosure is incorporated herein by reference.

Figure 1:
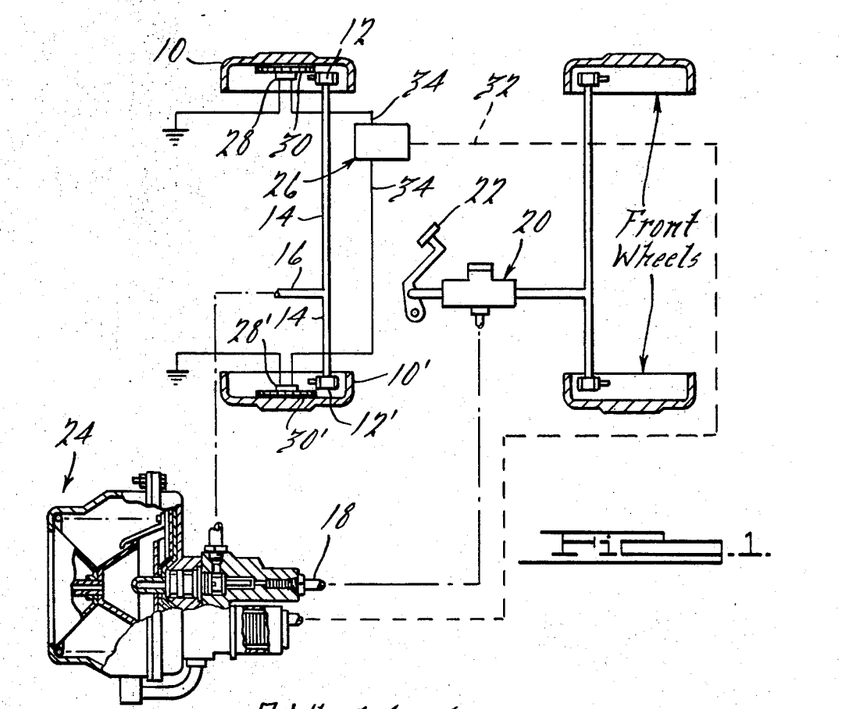
FIG. 1 is a generally schematic diagram of a skid control system embodying features of the present invention.

Looking now to FIG. 1, the schematic diagram generally shows the skid control system for use with the rear wheels of an automotive vehicle with the rear wheels being equipped with brake drums 10, 10' and wheel brake cylinders 12, 12'. Hydraulic lines 14 are connected to the cylinders 12, 12' and to a common fluid line 16 which is pressurized by a master cylinder assembly 20 via a line 18. The master cylinder assembly 20 can be of a conventional construction and actuated through a foot pedal 22. The fluid pressure from master cylinder 20 can be modulated by means of a modulating valve 24 which is connected between the fluid lines 18 and 16, and hence the modulating valve 24 can control the fluid pressure to the wheel brake cylinders 12, 12' and hence can control the operation of the brakes. The brakes associated with the brake drum 10, 10' can be of a conventional construction and hence the details thereof have been omitted for purposes of simplicity. The modulating valve 24 can be of the type shown and described in the copending patent application of Every et al., (supra) and the details thereof have been omitted for purposes of simplicity.

The modulating valve 24 in the present system is actuated in accordance with an electrical signal obtained from an electrical control module 26. The control module 26 receives information from sensors 28, 28' associated with each of the brake drums 10, 10' by means of exciter rings 30, 30'. The sensors 28, 28' can be of constructions known in the art and since the specific details thereof do not constitute a part of the present invention they have been omitted for the purposes of simplicity. The exciter rings 30, 30' can be of a toothed construction and the sensors 28, 28' can be of permanent magnet or electromagnetic construction which together define a variable reluctance pickup. The exciter rings 30, 30' would be rotated with the brake drums 10, 10' and hence with the associated wheels, and by virtue of the toothed construction, could via sensors 28, 28' generally provide a pulsating or alternating electrical signal via conductors 34, 34' to the module 26 which signal would be an indication of the rotational velocity of the associated wheels.

The control module 26 is constructed to sense the rate of change in the signal at the conductors 34, 34' and hence to sense the deceleration rate of the wheels associated with the brake drums 10, 10' and to provide an output signal in response to the magnitude of the deceleration of the wheels associated with the brake drums 10, 10' reaching a preselected magnitude corresponding to a skid condition existing or to be occurring at the wheels associated with drums 10, 10'. The output or control signal is transmitted by means of conductor 32 to the modulating valve 24. The average angular velocity for a pair of rear wheels driven by a prop shaft through an axle assembly can be obtained by sensing the angular velocity of the prop shaft. The advantages of the present invention can be obtained when either a direct signal is obtained from the wheels or when a signal of wheel angular velocity is obtained from the prop shaft. In the system of the present invention the control module 26 provides an "on" or "off" signal and modulation of the fluid pressure to the brake cylinders 12, 12' will be provided by the modulating valve 24.

Figure 2:
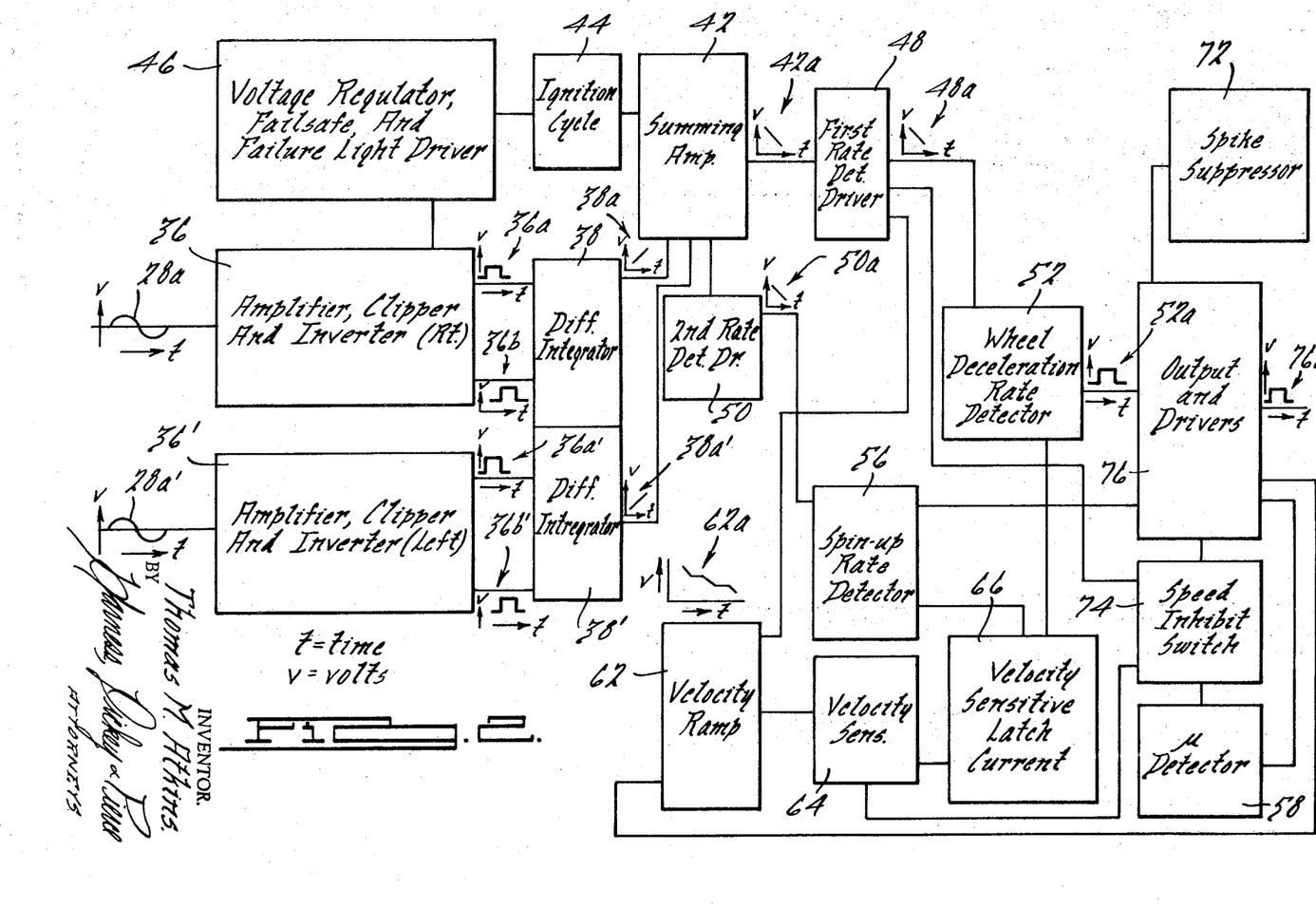
FIG. 2 is a block diagram depicting the various portions of a skid control system embodying features of the present invention.

A block diagram of the control modulator circuit 26 is shown in FIG. 2 and comprises first and second amplifier clipper and inverter sections 36, 36', first and second differentiator integrator sections 38, 38' associated with sections 36, 36', respectively, a summing amplifier section 42, an ignition cycle section 44, a voltage regulator, fail safe, and failure light driven section 46, a first rate detector driver section 48, a second rate detector driver section 50, a deceleration rate detector section 52, an acceleration or spin-up rate detector section 56, a $\mu$ detector section 58, a velocity ramp section 62, a velocity-sensitive section 64, a velocity-sensitive latch current section 66, a spike suppressor section 72, a speed switch section 74 and an output and driver section 76.

The amplifier, clipper and inverter sections 36, 36' are connected to the wheel sensors 28, 28' and receive the generally sinusoidal input waves (28a, 28a') which have a frequency which varies with the angular velocity of the rear drums 10, 10'. The amplifier clipper and inverter sections 36, 36' amplify and clip the sine waves 28a, 28a' to provide a square wave of substantially constant amplitude but varying in frequency in accordance with variations in the frequency of the input wave. An inverter portion is utilized to provide frequency doubling so that two square wave pulses, i.e., 36a, 36b and 36a', 36b', will be provided for each cycle of the sine wave input 28/a, 28a'. The square wave output, of constant amplitude, is transmitted from the sections 36, 36' to the differentiator integrator sections 38, 38' where it is differentiated and then integrated to provide for direct current signals 38a, 38a' which vary in magnitude generally in accordance with variations in the frequency of the input signals 28a, 28a'. Note that by frequency doubling in sections 36, 36' the amplitude of integrated signals 36a, 38a' is increased. The signals 38a, 38a' are added in the summing amplifier section 42 which, as will be seen, can be a Miller integrator whereby the output therefrom will vary in accordance with the average amplitude of signals 38a, 38a'. The output signal 42a from the summing amplifier section 42 is transmitted to the first rate detector driver section 48 and the second rate detector driver section 50. The sections 48 and 50 provide isolation of the summing amplifier section 42 from the remainder of the sections to prevent excess of loading of section 42. As will be seen, both sections 48 and 50 comprise emitter followers; hence the output signals 48a, 50a will generally follow the summed output 42a. As will be seen, the signals 48a, 50a from sections 48, 50 are used to control actuation and deactuation of the valve 24.

In the present system the output and driver section 76 provide the output signal 76a via conductor 32 to actuate and deactuate the modulating valve 24. Generally the section 76 is actuated in response to the occurrence of two conditions. One condition is a preselected detected deceleration rate which is indicative of an incipient skid condition and the other is a preselected wheel velocity. When both conditions occur a signal 76a is initiated causing modulating valve 24 to be actuated whereby pressure to the brakes is relieved. Note that this skid condition can occur under surface conditions which vary widely, i.e., wet ice to dry concrete, an under these conditions it is advantageous to vary the actuation of the valve 24. In order for the system to be responsive to different surface conditions, i.e., different $\mu$ surfaces, it has been found advantageous to vary the time at which the output section 76 is actuated. It has also been found desirable to vary the elapsed actuation time or "on time" of modulating valve 24 to accommodate various surface conditions. This requires variation in the time at which the output section 76 is actuated and deactuated, i.e., output signal 76a at conductor 32 initiated and terminated. In order to simplify the description of the operation of this system and the associated circuitry, first that part of the system will be described, which results in modulating valve 24 being actuated, i.e., output section 76 being actuated; next, that portion of the system will be described which deactuates the modulating valve 24, i.e., deactuating the output section 76; and finally the circuit details will be described. In the following description it should be remembered that wheel departure is controlled to optimize braking and stability. This can be done by control of valve actuation and deactuation in a selected manner.

VALVE ACTUATION

Looking to FIG. 2, the output signal 48a from the first and second rate detector driver section 48 is transmitted to the deceleration rate detector section 52.

The deceleration rate detector 52, by differentiating the signal 48a, provides a signal having a magnitude varying in accordance with the rate of change of the potential of the signal 48a. The deceleration detector 52 is responsive to negative changes, i.e., deceleration, and when the derivative of the signal 48a attains a preselected magnitude indicating an excessive deceleration rate the detector 52 is actuated to provide a signal 52a whereby the output section 76 can be actuated to initiate the output signal 76a whereby modulator 24 will be actuated and brake pressure relieved. However, in order to prevent excessive wheel departures initiation of output signal is further controlled as a function of vehicle velocity. Note that while the initiation of the output signal 52a can cause initiation of the output signal 76a, termination of the signal 76a is caused by termination of the signal 52a, only under certain circumstances to be described.

It is desirable that the actuation of the valve 24 be varied in accordance with different surface conditions. On high $\mu$ surfaces the tendency for the wheels to lock up is less than on low $\mu$ surfaces and hence the brakes can be held on longer and thus it is desirable that the actuation of the valve 24 be delayed on high $\mu$ surfaces. The above variation in valve actuation is provided by the present system with a spin-up characteristic of the wheels during brake relief being used to provide an indication of the $\mu$ of the surface, i.e., high $\mu$ high spin-up or acceleration. Thus, in order to accommodate various surface conditions, the speed inhibit switch 74 is utilized in conjunction with the velocity ramp 62 and $\mu$ detector 58 such that the time at which the valve 24 will be actuated will be varied under selective conditions. In general the speed inhibit switch 74 affects the actuation of output section 76 both as a function of vehicle speed and as a function of the $\mu$ of the surface and aids in controlling wheel departure; this is subsequently described in more detail.

SPEED SWITCH

The speed switch generally performs two important functions; one is to aid in the control of wheel departure and the other is to minimize the effects of wheel brake imbalance. In braking systems in which both rear brakes are closely balanced, both wheels will tend to react similarly under similar braking conditions. However, in many instances the vehicle brakes are unbalanced and the braking characteristics between one wheel and another will differ. As noted from the prior description, the system will operate generally in response to the average signal from both wheel sensors 28, 28'. Hence, it is possible for one wheel to rapidly approach a skid condition and to result in a sufficiently high average signal which would result in the output section 76 being turned on; however, at this same time the other wheel could be still substantially away from a skid condition. In this situation the rapidly decelerating wheel would be doing substantial braking while the other wheel would be contributing only a small part of its possible effectiveness. Release of the brakes in this condition would merely accentuate this condition resulting in an inefficient braking condition for the vehicle. In order to assure that both wheels contribute effectively to vehicle braking, speed inhibit section 74 has been provided. The speed switch section 74 obtains the velocity signal 48a from the first rate driver 48. Speed switch section 74 is connected to the output section 76 and will prevent its (and valve 24) actuation if the average speed of the two wheels is greater than a predetermined magnitude. For maximum effectiveness this magnitude is varied with vehicle speed. For higher vehicle speeds it is desirable that the switch section 74 be actuated when the average wheel speed is at or below a higher value of wheel speed than for lower vehicle speeds. As noted, it has been found that for efficient braking and stability the departure of wheel velocity from vehicle velocity should not be excessive. Thus at high vehicle velocities the switch 74 is actuated at a higher wheel speed selected to prevent excessive wheel speed departure. For lower vehicle velocity the wheel speed value is selected to be low enough to provide the desired wheel departure and also to be low enough to assure that both brakes are effectively braking.

Figure 4A:
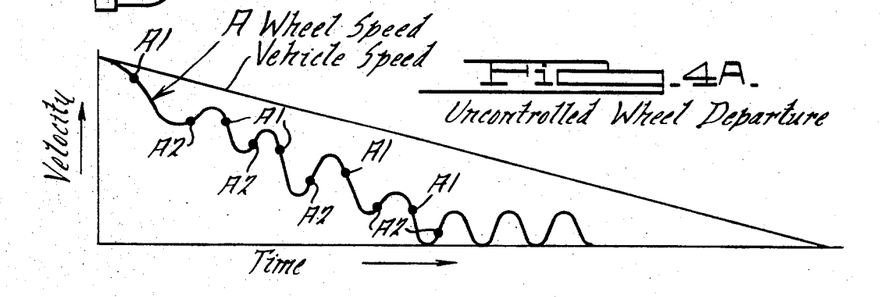
FIGS. 4A and 4B depict wheel departure for various vehicle and wheel speeds.
Figure 4B:
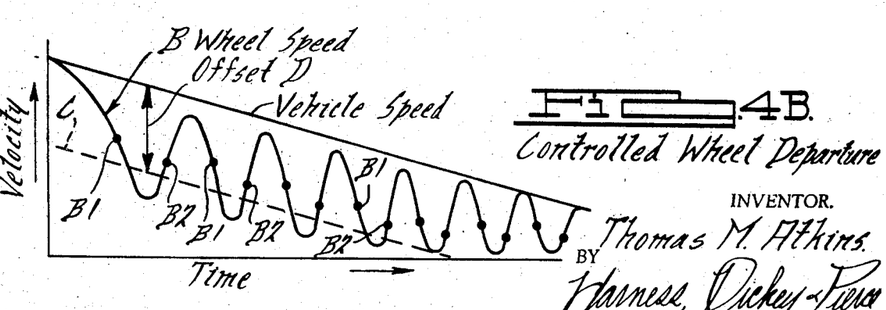

Looking now to FIGS. 4A and 4B, the effect of controlled and uncontrolled wheel departure is depicted. Curve A depicts a possible result with uncontrolled wheel departure for a low or medium $\mu$ surface. The points A1 indicated initiation of signal 76a to relieve the brakes and the points A2 indicated termination of signal 76a to reapply the brakes; this would be with the signal 76a controlled substantially solely by a generally fixed wheel deceleration rate actuating rate detector section 52. Note that the wheel speed departure compared to vehicle speed eventually becomes excessive and tends towards a locked wheel condition. The curve B in FIG. 4B generally depicts the result with controlled wheel departure. Note that the initiation of the signal 76a is varied with vehicle speed and occurs at higher wheel speeds for higher vehicle speeds whereby the tendency for the wheels to lock is lessened. As will be seen, the point of initiation is also varied as a function of the $\mu$ of the surface in a manner to be described. The points B1 indicated initiation of signal 76a to relieve the brakes and the points B2 indicated termination of signal 76a to reapply the brakes. Note that termination of signal 76a is also velocity sensitive for a purpose to be described.

In order to provide the desired wheel departure characteristic noted the speed switch section 74 is connected to the velocity ramp section 62 via the velocity-sensitive section 64 such that the speed setting at which switch 74 is operable will be varied as a function of vehicle speed. For low $\mu$ surfaces the vehicle wheels decelerate more rapidly than for high $\mu$ surfaces. Thus for a given setting of the switch 74 the wheel departure will be greater for low $\mu$ than for high $\mu$ surfaces. To compensate for their variation, and to maintain wheel departure at the desired magnitude, the speed setting at which switch 74 is operable will also be varied as a function of the $\mu$ of the surface. Thus for the output section 76 to be actuated two conditions must be satisfied. First the average wheel speed must be less than the setting of the switch 74 and secondly the deceleration rate of the wheels must exceed a preselected rate, i.e., as determined by the rate detector 52. Thus with the system of the present invention wheel departure is controlled and braking effectiveness is enhanced. The speed switch section 74 is provided with a latch such that once the output section 76 has been actuated the switch section 74 is ineffective even at speeds over the selected speed until the output section 76 has been deactuated by the means previously discussed at which time the speed switch section 74 is once again effective.

$\mu$ DETECTOR SECTION

As noted, the $\mu$ detector section 58 is used to vary the setting of the switch 74 as a function of the $\mu$ of the surface. The $\mu$ detector 58 senses $\mu$ as a function of the "on time" of the output section 76. In general the section 58 comprises a storage circuit which increases its charge with time and with the magnitude of the charge being determined by the "on time" of section 76. As previously noted, the output section 76 will be turned off in response to the spin-up of the wheels as determined by spin-up section 56. The spin-up rate, of course, will vary with the surface $\mu$ i.e., high $\mu$—high spin-up rate, low $\mu$—spin-up rate. Thus the time at which the section 76 will be turned off will vary with the $\mu$ of the surface and hence the magnitude of the elapsed "on time" of the section 76 will provide an indication of the $\mu$ of the surface. This parameter is sensed by $\mu$ detector 58 which in turn provides a signal to switch 74 to effect its operation in the manner noted.

While the deceleration rate detector 52 provides the signal 52a which can initiate the actuation of the output section 76, and hence actuation of valve 24, the deceleration rate detector 52 does not necessarily result in deactuation of valve 24.

VALVE DEACTUATION

It is desirable that the cessation of the actuation of the output section 76 be controlled to reflect different surface and speed conditions and also contribute to maintenance of the desired wheel departure. For high $\mu$ surfaces it is desirable to permit reapplication of brake pressure soon after initiation of spin-up since wheel spin-up is rapid. For low $\mu$ surfaces it is desirable to delay reapplication of brake pressure to permit the wheels to spin-up since wheel spin-up is slow. For low and high $\mu$ surfaces at high velocities it is desirable to delay brake reapplication to permit more spin-up than at lower velocities. This is effectuated by the system of the present invention. The output section 76 can be deenergized (valve 24 deactuated) through one of two sections, either through the deceleration rate detector section 52 as affected by the velocity-sensitive latch current section 66 or the acceleration rate detector section 56 as affected by the velocity-sensitive latch section 66. The spin-up rate detector section 56 generally controls for high and medium $\mu$ surfaces, while the deceleration rate detector section 52 will generally control low $\mu$ surfaces. As noted, both are affected by vehicle velocity. Again looking to FIG. 4A, it can be seen that if at high vehicle velocities the brakes are reapplied at low wheel velocities a substantial wheel departure can occur resulting eventually in a locked wheel condition. It has been found advantageous to inhibit brake reapplication over the speed range of a brake stop until the wheels have recovered speed at least to a point beyond a selected differential from vehicle speed. In the present system the velocity-sensitive latch section 66 operates with the spin-up detector 56 to prevent actuation of detector 56 (and hence termination of signal 76a and brake reapplication) until the wheel speed exceeds a velocity which is a selected amount less than vehicle speed. This is illustrated in FIG. 4B by curve C. Thus regardless of the magnitude of the spin-up rate of the wheel speed curve below the curve C the detector section 56 will not be actuated until the wheel speed exceeds the magnitude of curve C. Note that curve C generally is offset from the vehicle velocity curve by a fixed increment D. The point of termination B2 of signal 76a as occurring after the wheel speed exceeds curve C will vary with the spin-up rate. Thus the wheel departure is controlled by controlling the wheel velocity (in conjunction with the wheel deceleration rate) at which the brakes are relieved (signal 76a initiated) and the wheel velocity (in conjunction with the wheel acceleration rate) at which the brakes are reapplied (signal 76a terminated).

VEHICLE VELOCITY ANALOGUE

As noted, it is desirable to vary the deactuation time for the output section 76 and for the valve 24 in accordance with vehicle velocity. This is done by use of the velocity ramp section 62 through the velocity-sensitive latch section 66 and spin-up threshold section 56.

The velocity ramp section 62 is connected to the first rate detector drive section 48 and receives the signal 48a which is indicative of the angular velocity of the rear wheels. The velocity ramp 62 stores the signal 48a in a storage circuit which has a faster charge rate than discharge rate. The discharge rate is selected to reduce the magnitude of the stored signal in a preselected manner whereby vehicle deceleration is closely approximated. Thus with the occurrence of a skid condition the velocity signal 48a would substantially decrease in magnitude to a magnitude less than the stored velocity signal. The stored signal in the velocity ramp 62 would discharge at an average rate approximating the vehicle deceleration rate and hence provides a signal having an adjusted magnitude approximating vehicle speed. Note that an analogue of vehicle velocity is used since during braking, as the result of slip, the signal 48a does not provide a true indication of vehicle speed. The velocity ramp 62 providing an indication of the velocity of the vehicle in the above manner is connected to the velocity-sensitive section 64 to vary the operation of the spin-up rate detector 56 as a function of vehicle velocity. As noted it is desirable that wheel departure be maintained at a selected magnitude in order to provide for effective braking. In the valve actuation discussion the time of valve actuation was varied to provide the desired departure, i.e., prevent the wheels from decelerating too far. In the same context, it is desirable that the wheels be permitted to approach vehicle speed. If the reactuation of the valve occurs too soon the wheels will be rebraked at lower wheel speeds resulting in excessive departure. In the present system the spin-up detector section 56 is operated on by the vehicle velocity signal such that the valve 24 will not be deactuated unless the wheel speed has attained a selected difference relative to vehicle speed. The velocity-sensitive section 64 is provided to be operable to vary the actuation of the speed switch section 74 and to provide a velocity analogue signal to the velocity latch section 66. For medium and high $\mu$ surfaces deactuation of valve 24 will be controlled by the spin-up rate detector 56. For low $\mu$ surfaces the spin-up rate will be insufficient to actuate the spin-up rate detector 56 and deactuation of valve 24 is caused by the deceleration rate detector 52.

The deceleration rate detector section 52, as noted, can be operable to turn output section 76 on and actuate valve 24 in response to a determinable deceleration rate. The section 52, however, once actuated will be deactuated at a substantially lower deceleration rate and includes a timing circuit set to insure that sufficient time has elapsed whereby the wheels are spinning up. This time is selected to insure spin-up on low $\mu$ surfaces. As noted at high vehicle velocities and on low $\mu$ surfaces, it is desirable to maintain the output section 76 and valve 24 actuated longer. The velocity-sensitive latch current section 66, as operable from the velocity ramp section 62, senses the high vehicle velocity condition and will provide a signal to the deceleration rate detector section 52 for varying the time at which the rate detector section 52 will be deactuated to permit longer spin-up time for low $\mu$ surfaces at high vehicle velocity.

A spike suppressor section 72 is provided to eliminate actuation of the output section 76 as a result of transients. The voltage regulator section 46 provides regulated voltage for the succeeding circuitry, as will be seen, and is also provided with a fail-safe construction and with means to provide a visual indication to the vehicle operator that the skid control apparatus has been deactuated as a result of malfunction and that some correction is required. The ignition cycle circuit 44 is connected to the voltage regulator section 46 and is responsive to actuation of the vehicle ignition to provide a pulse to the summing amplifier section 42 whereby output section 76 will be actuated each time the ignition is turned on. In this way the valves, seals, etc., will be actuated to prevent deterioration. In this regard reference is made to the copending U.S. Pat. application of Anthony C. Fielek, Jr. and Francis J. Weber for Skid Control System Including Valve Cycling and Checking Circuit, Ser. No. 647,001, filed June 19, 1967, and the subject matter of that application is incorporated herein by reference.

Figure 3A:
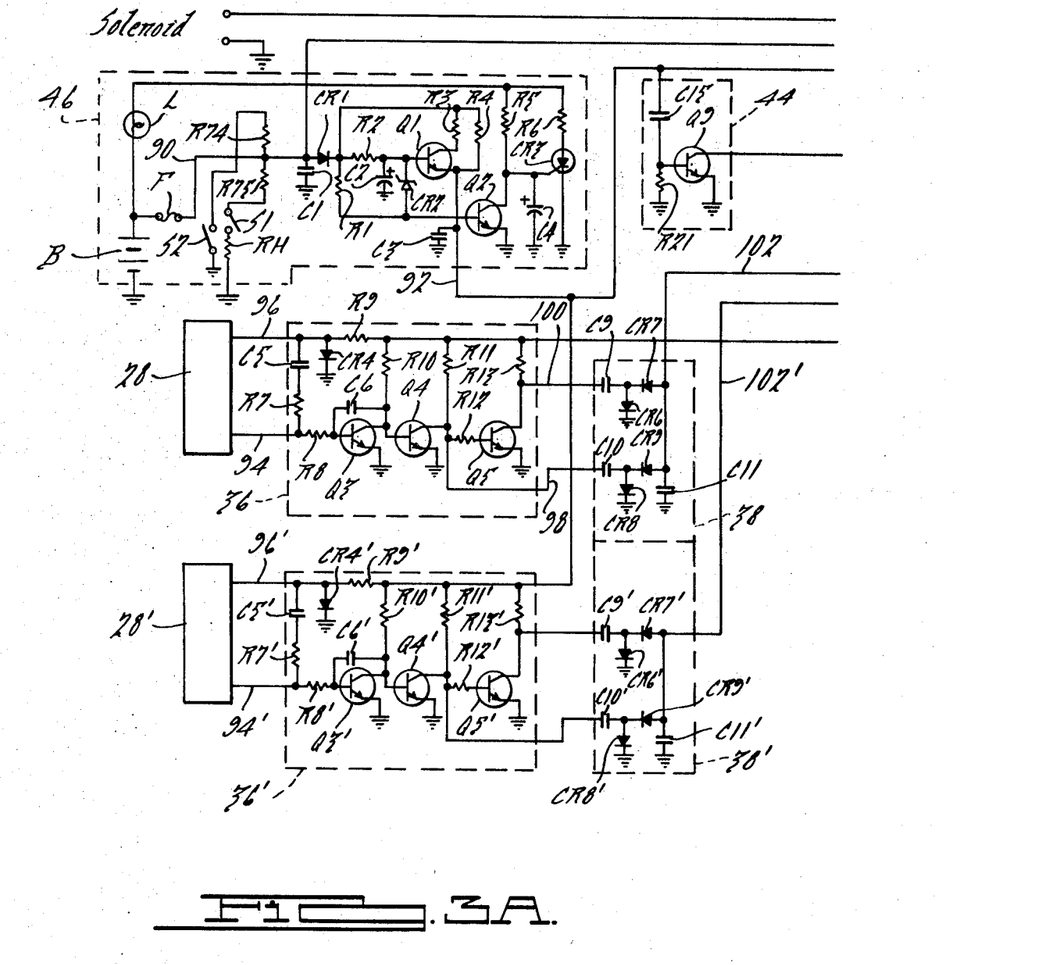
FIGS. 3A and 3B (put together) are a schematic diagram of an electrical control circuit for the system of the present invention.
Figure 3B:
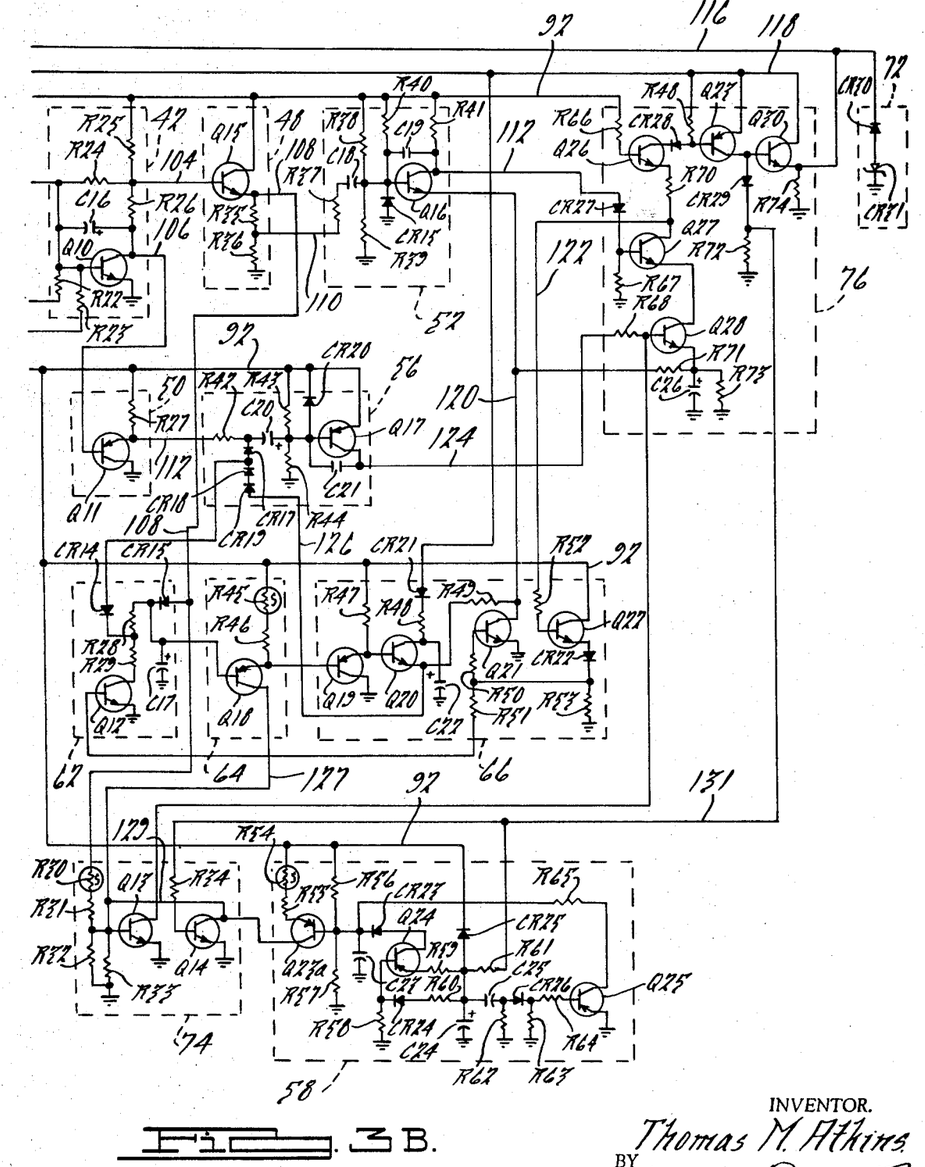

Looking now to FIGS. 3A and B an electrical schematic diagram of the various sections previously described is shown.

VOLTAGE REGULATOR, ETC., SECTION 46

The battery B has its negative terminal connected to ground and has its positive terminal connected to a fail-safe fuse F, which in turn is connected to a conductor 90. An NPN transistor Q1 has its collector connected to the conductor 90 through parallely connected load resistors R3 and R4 and a diode CR1 and has its emitter connected to the output via conductor 92 from which is derived the regulated B plus. The base of transistor Q1 is connected to the diode CR1 via a biasing resistor R2. A bypass capacitor C1 is connected from conductor 90 to ground and another bypass capacitor C2 is connected from the base of transistor Q1 to ground. The base of transistor Q1 is also connected to ground by means of a Zener diode CR2 via the base-emitter circuit of a second NPN transistor Q2, which has its emitter connected to ground. A biasing resistor R1 is connected at the junction of the diode CR1 and resistor R2 to the base of transistor Q2. Hence, the Zener diode 22, in conjunction with remaining circuitry, will tend to maintain the bias at the base of Q1 and its output constant. The transistor Q2 and other associated circuitry shown in the circuit section 46 operate in conjunction with the fail-safe portion of the circuit. As noted in the copending Every application (supra) the brake pressure is relieved by actuation of the valve which is energized by the output signal 76a. If the valve is improperly actuated and held actuated through a circuit malfunction, substantially no vehicle braking will be attainable. The time for a normal valve cycle is known; hence a timing circuit is used such that with valve actuation for a preselected time interval greater than the normal time interval the valve will be deactuated. The timer comprises a thermal switch S2 which is actuated by a heater RH. Heater RH is connected from conductor 90 to ground via a current-limiting resistor R75 and a valve-actuating switch S1. Switch S1 is normally open and will be closed when the valve 24 is actuated. At this time heater RH will be closed. The switch S2 connects fuse F to ground via current-limiting resistor R74 and upon closing will result in fuse F opening the circuit and deenergizing the valve 24 permitting normal braking.

With the fuse F out, the transistors Q1 and Q2 are rendered nonconductive. Transistor Q2 controls the gate of controlled rectifier CR3 and has its collector connected to the gate such that when Q2 is conductive CR3 cannot conduct. When Q2 is nonconductive, as when fuse F opens, CR3 can conduct. CR3 has its gate connected to ground via capacitor C2 and has its gate connected to battery B via resistor R5 and failure light L. The anode-cathode circuit of CR3 is connected across light L and battery B. Thus in the event of a malfunction and opening of fuse F, CR3 will be rendered conductive and light L will be lit to provide a visual indication of malfunction to the vehicle operator.

As can be seen from the drawings of FIGS. 3A and 3B, the B plus line 92 is common throughout the circuitry.

AMPLIFIER, CLIPPER, ETC., SECTIONS 36, 36'

The amplifier, clipper and inverter section 36 includes NPN transistors Q3 and Q4 which are connected together to amplify the input signal. Each transistor Q3 and Q4 is biased to be driven into saturation such as to provide a square wave output signal 36a. An NPN transistor Q5 is connected to the transistor Q4 and acts as an emitter-follower and inverter whereby the one output signal 36a can be obtained from the inverter Q5 and the other 36b can be obtained from Q4, such as to provide for the frequency doubling previously discussed.

Thus the sensor 28 is connected to the amplifier, clipper and inverter section 36 via conductors 96 and 94, with conductor 94 being connected to the base of the transistor Q3 via dropping resistor R8; Q3 has its emitter connected directly to ground. The collector of Q3 is connected to B plus 92 via a dropping resistor R10, with resistor R10 being connected to conductor 96 via a dropping resistor R9. Conductor 96 is connected to ground via a biasing diode CR4 which biases the sensor signal at a desired level for subsequent amplification. A feedback capacitor C6 is connected between the collector and base of the transistor Q3. A capacitor C5 and resistor R7 are connected between conductors 94 and 96 to provide for an improved input signal.

The amplified signal from the collector of transistor Q3 is transmitted directly to the base of transistor Q4 which has its collector connected to B plus line 92 via load resistor R11 and has its emitter connected directly to ground. The result of the amplification of input signal 28a by transistors Q3 and Q4 is a square wave output 36a appearing at the collector of Q4, which is transmitted via output conductor 98. As noted, the transistor Q5 is used as a phase inverter and hence its base is connected to the output at collector of transistor Q4 via a biasing resistor 12. Transistor Q5 has its collector connected to B plus line 92 via a load resistor R13 and has its emitter connected to ground. The inverted square wave 34b from the collector of transistor Q5 is transmitted to the output by conductor 100. Hence the output pulses 36a and 36b will be provided at conductors 100 and 98, respectively. The output will be a square wave of substantially constant amplitude and of a frequency which varies in accordance with the frequency of the input signal 28a from the sensor 28. The amplifier, clipper and inverter circuit 36' is identical to that of the section 36 and hence the same numerical designations have been applied to similar components with the addition of a prime.

The differentiator integrator circuit 38 includes two separate differentiating circuits operating with integrating circuits having a common integrating capacitor C11; these circuits operate in a manner similar to like circuits shown and described in the patent to Anthony C. Fielek, Jr., U.S. Pat. No. 3,511,542 issued May 12, 1970, for Skid Control System Including Control Circuit for a Hydraulic Modulating Valve and that application is incorporated herein by reference. The square wave output 36a at the output conductor 100 is differentiated via a capacitor C9 through a diode CR6 which has its cathode connected to ground. A second diode CR7 has its cathode connected to the anode of CR6 and has its anode connected to the capacitor C11 which is in turn connected to ground. The differentiated signal is integrated and the integrated signal appears as a direct potential across the capacitor C11. In a similar manner, the output square wave 36b at conductor 98 is differentiated and integrated with the integrated signal appearing across C11. Thus the conductor 98 is connected to differentiating capacitor C10 which in turn is connected to diode CR8 which has its cathode connected to ground. Diode CR9 has its cathode connected to the anode of diode CR8 and has its cathode connected to the capacitor C11. The capacitor C11 is connected to the summing amplifier section 42 via an output conductor 102. The differentiator integrator circuit 38' is identical to section 38 and hence the same numerical designations have been applied to similar components with the addition of a prime; hence the output capacitor C11' is connected to the summing amplifier 42 via output conductor 102'. The summing amplifier 42 is a Miller integrator amplifier which provides at its output a potential varying in magnitude in accordance with variations in potential of the sum of the magnitudes appearing across the integrating capacitors C11 and C11'.

SUMMING AMPLIFIER SECTION 42

The summing amplifier section 42 includes an NPN transistor Q10 which has its base connected to conductor 102 via a biasing resistor R22 and has its base connected to conductor 102' via a similar biasing resistor R23. Transistor Q10 has its emitter connected to ground and its collector connected to the B plus line 92 via a voltage divider network comprising serially connected resistors R25 and 26. A capacitor C16 is connected between the base and collector of transistor Q10. A base biasing resistor R24 is connected from the juncture of resistors R25 and R26 to the base of transistor Q10. Transistor Q10 is biased to be normally on and will have output signals 42a appearing at conductor 104 located at the juncture of resistors R25 and R26 and at conductor 106 connected to the collector of Q10; the output signals 42a will vary in amplitude generally in accordance with the sum of the output signals 38a and 38a'. Note that transistor Q10 is normally saturated and hence the output potential at conductors 104 and 106 will be a positive, minimum potential; however, as the charging capacitors C11 and C11' become more negative (with increasing frequency), Q10 conducts less and the potential at conductors 104 and 106 will increase. Capacitor C16 and its associated circuitry provide an additional integrating function whereby the relatively smooth output potential is provided at the output conductors 104 and 106. As noted, the output signal 42a is transmitted to the first rate detector driver section 48 and also to the second rate detector driver section 50, both of which are emitter-follower sections and which are provided to isolate and prevent loading of the summing amplifier section 42.

RATE DETECTOR DRIVER SECTIONS 48 and 50

The first rate detector driver section 48 comprises an NPN transistor Q15 connected as an emitter-follower and which has its base connected to conductor 104 and has its collector connected to the regulated B plus line 92. The emitter is connected to ground via a voltage divider network comprising serially connected resistors R35 and R36. The output signals 48a from the transistor Q5 are taken via a conductor 108 connected to the emitter of Q15 and a conductor 110 connected to the juncture of resistors R35 and R36.

With the second rate detector driver section 50, PNP transistor Q11 is connected as an emitter-following and has its base connected to conductor 106 and has its collector connected to ground and its emitter connected to the B plus line 92 via a load resistor R27. The output from the follower Q11 is taken via a conductor 112 connected to its emitter. The signal 48a at output conductor 110 is connected to the input of the deceleration rate detector section 52 and to the inputs of the velocity ramp section 62 and to the speed inhibit switch section 74 via conductor 108. The output signal 50a at conductor 112 is connected to the acceleration rate detector section 56. In the discussion of the succeeding sections it should be kept in mind that signals 48a and 50a are representative of wheel angular velocity.

DECELERATION RATE DETECTOR SECTION 52

The rate detector section 52 is used to actuate the driver section 76 (and valve 24) and in some cases to deactuate the section 76 (and valve 24). The section 52 is operative in response to a determinable rate of change of the velocity signal 48a indicating an excessive deceleration rate at the wheels to actuate section 76.

The section 52 includes a differentiating circuit and hence has a differentiating capacitor C18 connected to conductor 110 via a resistor R37 and is connected to ground via a resistor R39. An NPN transistor Q16, which is normally conductive, has its base connected to the juncture between resistor R39 and capacitor C18 and is connected to ground via a diode CR15 which acts as a clamp and is connected across resistor R39. The base of transistor Q16 is biased via serially connected resistor R38 which is connected to the B plus line 92.

The emitter of Q16 is connected to ground via serially connected resistors R71 and R73 in the driver section 76. The values of resistor R38 relative to the other parameters of the circuit is such as to provide for a selected bias at the base of transistor Q16 maintaining transistor Q16 normally on. Q16 will be maintained on until the potential at the base as provided by the differentiating circuit including capacitor C18 attains a magnitude sufficiently low to cut Q16 off. Threshold bias as previously noted is selected to present a preselected magnitude of wheel deceleration indicating that the wheels are decelerating at an undesirable rate in which case an output signal 52a is provided whereby the modulating valve 24 is actuated and skid control action occurs, i.e., brake pressure relieved. Transistor Q16 has its collector connected to the B plus line 92 via a load resistor R41, and has a feedback capacitor C19 connected between its base and collector. When the differentiated signal at the base of Q16 goes sufficiently low, the transistor Q16 will be turned off resulting in section 76 and modulating valve 24 being turned on. The output signal 52a from the rate detector section 52 is transmitted to the output and driver section 76 to actuate the modulating valve 24 via output conductor 112 connected to the collector of Q16. The valve 24 can be deactuated, i.e., output section 76 deactuated, when the transistor Q16 is rendered conductive. This occurs in a manner to be described.

As previously noted, it is desirable that the point at which section 76 is actuated and/or deactuated be varied in accordance with various surface and speed conditions whereby wheel departure can be maintained at the desired level. To provide the above variations actuation of section 76 is controlled by the speed switch section 74 in a manner to be described.

OUTPUT AND DRIVERS SECTION 76

The output and drivers section 76 comprises transistors Q23, Q26, Q27, Q28 and Q30 all of which are normally maintained nonconductive. The transistor Q30 is a power transistor and is connected to the solenoid for the modulating valve 24 via an output conductor 116 whereby when transistor Q30 is rendered conductive valve 24 is actuated to relieve brake pressure. Transistor Q30 is an NPN-type transistor and has its emitter connected to the output conductor 116 and has its base connected to a diode CR29 which has its cathode connected to resistor R72 which is connected to ground. The conductivity of the power transistor Q30 is controlled by the switching transistor Q23 and hence the base (input) of Q30 is connected to the collector (output) of the PNP transistor Q23. Q23 has its emitter connected to the battery B via conductor 118. Transistor Q23 is normally biased off and has its base connected to the conductor 118 via a biasing resistor R69; the base of switching transistor Q23 is also connected to the collector of another switching transistor Q26 via diode CR28.

The base of Q26 is connected to the regulated B plus line 92 via bias resistor R66. Q26 has its output from its emitter connected to a load resistor R70. Note that Q26 is connected to the B plus line 92 and hence provides voltage stable actuation for Q23 and Q30. Q26 is connected to control transistor Q27 with resistor R70 such that the conductivity of Q26 (and hence of Q23 and Q30) is determined by Q27.

The NPN-type transistor Q27 is normally nonconductive and has its collector connected to the resistor R70 and has its base connected to ground via a resistor R67. The emitter of transistor Q27 is connected to ground through the emitter-collector circuit of a second control transistor Q28 and hence the conductivity of Q27 is determined by Q28 and vice versa. Transistor Q28 is of the NPN-type and has its collector connected directly to the emitter of transistor Q27 and has its emitter connected to ground via load resistor R73 and bypass capacitor C26. Thus the conductivity of transistor Q28 is determined by Q27. The base of transistor Q28, in turn, is connected to ground through a transistor Q13 in the speed inhibit switch section 74 (which operates in a manner to be described). Thus in order for the power transistor Q30 to be rendered conductive, i.e., output section 76 and modulating valve 24 actuated, both control transistors Q27 and Q28 must be placed in a conductive condition. Also to maintain the transistor Q30 conductive both control transistors Q27 and Q28 must be maintained conductive. As will be seen, the control transistor Q27 is controlled by the deceleration rate detector section 52 to actuate and deactuate the output section 76 while control transistor Q28 is controlled by the speed switch inhibit section 74 to permit actuation of output section 76 and by the acceleration rate detector section 56 to deactuate output section 76.

The output transistor Q16 of the deceleration rate detector section 52 has the output conductor 112 connected to the base of the first control transistor Q27. Thus the occurrence of an output signal indicating that the preselected deceleration rate has been reached or exceeded will result in Q16 being rendered conductive which, in turn, will bias the transistor Q27 into a conductive state. Note however that Q27 cannot conduct unless transistor Q28 can conduct. The conduction of Q28, however, is controlled both by the speed inhibit switch section 74 and also by the acceleration rate detector section 56, both to be subsequently described. Assuming, however, that transistor Q28 is at this time conductive, the output signal from transistor Q16 will render transistor Q27 conductive which in turn will turn on switching transistors Q26 and Q23 which will then render power transistor Q30 conductive whereby the output signal 76a will be initiated and the modulating valve 24 will be actuated whereby brake pressure will be relieved. Upon cessation of the conductivity of transistor Q16 and termination of the output signal at conductor 112, control transistor Q27 will be turned off whereby the signal 76a will be terminated resulting in deactuation of the modulating valve 24 and reapplication of brake pressure.

In order to permit wheel spin-up, the transistor Q16 is maintained conductive even after the deceleration rate is no longer at the objectionable level. This is provided by the combined effect of the charge time of capacitor C18 and by the transistor Q28. With Q28 conductive the potential at the resistor R73 in the emitter circuit of the transistor Q16 is increased. This tends to maintain Q16 nonconductive and requires an even greater increase in the bias at the base of Q16 and hence requires an even larger charge time. As noted, this charge time period is selected whereby generally the transistor Q16 will control to turn the output section 76 off for low μ surface conditions, i.e., low spin-up.

As previously discussed, it is also desirable that the output section 76 be maintained on or actuated for a longer period for higher vehicle velocities. Hence, the velocity-sensitive latch current section 66 (which operates in a manner to be described) in connected to the resistor R73 via an output conductor 120 such that for higher vehicle velocities the potential at the resistance R73 will be varied in a manner whereby a longer discharge time for capacitor C18 will be required and transistor Q16 will be maintained on for a longer time. Note that the velocity-sensitive latch current section 66 is connected to the output section 76 by means of a conductor 122 connected to the collector of transistor Q27 whereby the velocity-sensitive latch current section 66 is maintained inoperative (in a manner to be described) until the section 76 has been actuated. This is provided so that the velocity-sensitive latch current section 66 will have no affect on the actuation of the deceleration rate detector section 52 and on the cutoff of the transistor Q16 but will be effective only, after section 76 has been actuated, in turning the transistor Q16 on and hence effective only in deactuating the output section 76. Thus the section 76 will be actuated in response to the output signal 52a from the deceleration rate detector section 52 and will be deactuated upon cessation of the output signal 52a when the transistor Q16 is turned on.

The deceleration rate detector section 52 provides only one of the means of deactuating the output section 76 and, as noted, this is effective for low μ surface conditions. For high μ surface conditions the acceleration rate detector section 56 is utilized.

ACCELERATION RATE DETECTOR SECTION 56

The acceleration rate detector section 56 generally is a differentiating and threshold circuit which senses the rate of change of the velocity signal 50a from the second rate detector driver section 50. Hence the acceleration rate detector section 56 has a differentiating capacitor C20 which is connected to the output conductor 112 from the second rate detector driver section 50 via resistor R42. Capacitor C20 is connected to the base of PNP transistor Q17 which has its emitter at the B plus line 92 and has its collector connected to its base via a feedback capacitor C21. The transistor Q17 is base biased by means of a resistor R43 connected from the B plus line 92 to its base with the base also being connected to ground via resistor R44. A regulating diode CR20 is connected between the base and emitter of transistor Q17 with its anode connected to the base. The output signal from the transistor Q17 is connected to the base of transistor Q28 via the conductor 124 which is connected to resistor R68. Thus, upon the occurrence of a high wheel acceleration, indicating a high wheel spin-up, and also indicating a high μ surface, the transistor Q17 will be turned off thereby decreasing the potential at the base of the transistor Q28 turning the transistor Q28 off. With Q28 turned off, transistor Q27 is rendered nonconductive along with transistors Q26, Q23 and Q30 whereby the output section 76 will be deactuated and the modulating valve 24 will be deactuated resulting in reapplication of brake pressure.

As previously noted, it is desirable that the wheel departure be controlled such that it is not excessive. This is done by controlling both the actuation and deactuation of section 76 as a function of vehicle and wheel velocity. In this regard, actuation is controlled by the speed switch section 74. Deactuation is controlled by spin-up rate detection section 56 as it in turn is affected by the velocity-sensitive latch section 66. Thus the analogue of vehicle velocity signal is transmitted to the input of the spin-up rate detector section 56 via conductor 126. The object here is to permit the wheels to spin up close to vehicle speed. Hence the signal from latch section 66 is designed to prevent actuation of detector section 56 (and hence brake reapplication) despite the occurrence of the required acceleration rate unless the velocity of the wheel exceeds a selected velocity. This selected velocity is chosen as a generally fixed increment from vehicle speed over the speed range of the vehicle during a brake stop. Thus as can be seen in FIG. 4B, the μ velocity signal follows the curve C as transmitted to the spin-up section 56 with the curve C being a selected, fixed offset from the vehicle velocity curve whereby the wheel speed signal will be ineffective to actuate spin-up section 56 until it exceeds the magnitude of the curve C. However, once this magnitude has been exceeded then the time for actuation of spin-up section 56 will be determined by the spin-up rate, i.e., higher spin-up rate, faster actuation. The above is done by a clamp circuit comprising serially connected diodes CR17, CR18, and CR19 with the anode of CR19 being connected to conductor 126 and with the cathode of CR17 being connected at the juncture of differentiating capacitor C20 and resistor R42. The diodes CR17, CR18, CR19 generally prevent any wheel velocity signal from conductor 112 from affecting Q17 until the potential at CR17, etc. is exceeded. The potential at CR17, etc. will, however, be below the vehicle speed signal by the fixed amount D (see FIG. 4B) over the vehicle speed range and hence the desired result, as noted, will be attained.

Thus in the deactuation of the output section 76 both the deceleration rate detector section 52 and the acceleration rate detector section 56 have their operating characteristics varied with vehicle velocity to provide the desired wheel departure characteristics. The vehicle velocity signal is provided by the velocity-sensitive section 64 and the velocity-sensitive latch current section 66, both of which are affected by the velocity ramp section 62.

VELOCITY RAMP SECTION 62

The velocity ramp section 62 comprises a storage circuit with the magnitude of the stored charge at any one time being used to provide an indication of vehicle velocity. The magnitude of the charge is decreased in accordance with a preselected discharge rate to correspond to preselected deceleration rate whereby an analogue of vehicle velocity is obtained. The velocity signals 42a and 50a provide a true indication of vehicle velocity only when wheel speed and vehicle speed are the same, i.e., no slip. Since during a skid controlling cycle there is substantial slip the analogue is used to provide an indication of vehicle velocity. Thus the velocity ramp section 62 includes a storage capacitor C17, the magnitude of charge of which is used to provide an analogue of the magnitude of vehicle velocity. The capacitor C17 has one side connected to ground and has its opposite side connected to receive the velocity signal 48a via the conductor 108 through diode CR15 which has its cathode connected to the capacitor C17. Note that in the circuit described thus far the charge path is defined and as long as the potential of the velocity signal at conductor 108 is greater than the charge at capacitor C17, charge current will flow through the diode CR15. The charge path has a fast charge time. The discharge path of the capacitor C17 includes serially connected to direct charge resistors R28 and R29 which are connected to the capacitor C17 and the collector of an NPN transistor Q12 which has its emitter connected to ground. Q12 is normally conductive and will be rendered nonconductive when an appropriate bias is transmitted to the base which is connected to the latch section 66. The transistor Q12 is deactuated by the latch section 66 in response to actuation of output section 76 and will be actuated by latch section 66 when output section 76 is deactuated. Thus, the transistor Q12 will be deactuated only while section 76 is actuated. During actuation of Q12 velocity capacitor C17 will discharge through resistor R29 and the emitter-collector circuit of Q12. When Q12 is not actuated, C17 will not discharge. The discharge rate of C17 (with Q12 on) is selected to be substantially higher than the vehicle deceleration rate, i.e., 44 ft./sec.² in one application. However, the discharge of C17 is interrupted (see signal 62a, FIG. 2) when the section 76 is actuated (brakes released) and hence the average charge on C17 will decay at a rate closely proximating vehicle deceleration. This occurs since the "on time" of section 76 is long for low μ surfaces on which the vehicle deceleration will be low and shorter for high μ surfaces on which the vehicle deceleration will be high. Looking to output signal 62a, the horizontal portions (nondischarge) occur when the section 76 is actuated and the inclined portions (discharge) occur when the section 76 is deactuated. Thus for low μ the "on time" is long and the horizontal portions are long resulting in a shallow slope; for high μ the "on time" is short and the horizontal portions are short resulting in a steep slope. The result is an analogue closely proximating vehicle speed.

Note that the capacitor C17 is connected to the juncture of diodes CR17 and CR18 in detector section 56 via diode CR14 and R28. This acts as a feedback circuit whereby the exponential discharge of C17 is linearized to provide a more accurate indication of vehicle velocity.

The output 62a from the velocity ramp section 62 is utilized in both the velocity-sensitive section 64 and in the velocity-sensitive latch current section 66.

VELOCITY-SENSITIVE SECTION 64

This section generally comprises an amplifier circuit which has an output which follows the variations in charge of the velocity ramp capacitor C17; this circuit includes a PNP transistor Q18 which has its collector connected to the speed switch section 74 via conductor 127. Q18 has its emitter connected to B plus line 92 via load resistors R45 and R46. Note that resistors circled and designated "S" are temperature varying and hence provide temperature compensation. The base of the transistor Q18 is connected to the velocity ramp capacitor C17. The transistor Q18 is generally nonconductive and is rendered conductive by the vehicle velocity signal and its conductivity will vary with variation in the charge on the ramp capacitor C17. The vehicle velocity output from Q18 will be transmitted to the latch section 66 via the emitter of Q18 and to the speed switch section 74 via conductor 127.

VELOCITY-SENSITIVE LATCH CURRENT SECTION 66

The emitter of Q18 is connected to the base of an amplifying, PNP transistor Q19 which has its emitter connected to the base of an NPN transistor Q20. The emitter of Q19 is connected to B plus line 92 via load resistor R47; its collector is connected to ground. Q19 generally follows the output of Q18 and hence provides a velocity signal at its emitter which is connected to the base of Q20. The collector of Q20 is connected to the positive side of the battery B via resistor R48 and diode CR21 and conductor 118. A capacitor C22 connects its collector to ground. The conduction of transistors Q20 will vary with conduction of Q19 and hence will vary in response to the signal from Q18. The emitter of Q20 is connected to conductor 126 and hence provides the vehicle velocity analogue signal to diodes CR17, CR18 and CR19 to cause operation of the spin-up section 56 in the manner previously discussed (see FIGS. 4A and 4B). As previously noted, a velocity signal is also transmitted to effect the turnoff characteristic of Q16 of selector section 52. This is done by NPN transistor Q21.

The output from the collector of transistor Q21 is connected to the conductor 120 and hence upon conduction of transistor Q21 the resistance across R73 will be varied to vary the on time, i.e., turn-on potential, for the transistor Q16 in the rate detector section 52 such that at high vehicle velocities a longer charge time for capacitor C18 will be required to render Q16 conductive to deactuate output section 76.

Q21 has its emitter connected to ground and its base connected to ground via resistor R50 and R53. The collector-emitter circuit of Q21 defines the ground path for the emitter of Q20 which is connected to the collector of Q21 via load resistor R49. Thus Q20 will not conduct unless Q21 is conductive and when Q21 conducts velocity signals will appear at conductors 126 and 120 to function in the manner described.

As noted, it is desirable that the variations in vehicle velocity be effective on the conductivity of the transistor Q16 only after the output circuit 76 has been actuated, i.e., so that there will be no effect on the time or deceleration rate at which the transistor Q16 will be turned off. This latter function is provided by the NPN transistor Q22 which has its emitter connected to ground via diode CR22 and resistor R53 and has its collector connected to the B plus line 92. The base of the latching transistor Q22 is connected to the collector of transistor Q27 via resistor R52 and conductor 122. The base of Q21 is connected to the emitter of Q22 via R50 and CR22 such that Q21 will not conduct unless Q22 conducts. The transistor Q22 is normally nonconductive and when in this condition will maintain transistors Q21 and Q20 nonconductive. However, when the output section 76 is actuated and transistor Q27 is turned on and transistor Q22 will be turned on, via the potential at conductor 122, thereby placing transistors Q21 and Q20 in a conductive condition whereby the velocity signals will be transmitted in the manner discussed.

Note that the base of Q12 in ramp section 62 is connected to the emitter of latch transistor Q22 via resistor R51 and diode CR22. Thus Q12 also will conduct only when Q22 conducts and hence will conduct only when section 76 is actuated thereby providing the discharge characteristic for velocity capacitor C17 as previously discussed. Thus the velocity of the vehicle as obtained from the analogue from the potential across capacitor C17 is utilized to vary the off time or the time at which the output section 76 will be deactuated and hence the time at which the modulating valve 24 will be turned off and the brake pressure reapplied.

SPEED INHIBIT SWITCH SECTION 74

As previously noted it is desirable in order to account for wheel and/or brake unbalance that the output section 76 be deactuated until both wheels are decelerated to a determinable velocity. It is also desirable that this wheel velocity vary with vehicle speed such that at higher vehicle velocities the actuation of section 76 will be inhibited to higher wheel velocities and vice versa for lower vehicle velocities. It is also desirable that for high $\mu$ surfaces the actuation of section 76 occur at lower wheel velocities. This is done by the speed inhibit switch section 74 as affected by the $\mu$ detector section 58.

Section 74 includes an NPN transistor Q13 which has its collector connected to the base of the control transistor Q28 and has its emitter connected to ground. Its base is also connected to ground via parallelly connected biasing resistors R32 and R33. The vehicle velocity signal is transmitted from velocity-sensitive section 64 to the base of transistor Q13 via conductor 127. Transistor Q13 is normally conductive and will be rendered nonconductive when the vehicle velocity signal is of a magnitude corresponding to a wheel speed less than a selected wheel speed at which time transistor Q13 will be rendered nonconductive. The wheel speed signal is transmitted to the base of Q13 via resistors R30, R31. With Q13 nonconductive control transistor Q28 will then be in a condition to conduct since the ground circuit for its base is through the collector-emitter circuit of transistor Q13. If the average wheel speed is greater than the vehicle speed signal as determined from conductor 127, transistor Q13 will not be rendered conductive and hence the transistor Q28 cannot conduct, in this case Q27 cannot be rendered conductive despite the fact that an actuating signal would appear at the conductor 112 from the transistor Q16. Thus the transistor Q13 will assure that the output section 76 cannot be actuated unless the average wheel speed is less than a preselected magnitude. In general, the vehicle velocity signal from conductor 127 will represent a velocity less than a velocity corresponding to actual vehicle speed. This signal will also vary with actual vehicle velocity and hence be high for high vehicle velocities and low for low vehicle velocities. This provides the wheel departure control previously noted.

It is desirable that the speed inhibiting affect be effective only in the actuation of the output circuit 76 and not while circuit 76 is actuated. This function is provided by the NPN transistor Q14 which has its collector connected to the base of transistor Q13 and has its emitter connected to ground. The base of transistor Q14 is connected to the juncture between resistor R72 and diode CR29 in the output circuit of control transistor Q23 via a current-limiting resistor R34 and conductor 131. Thus when the output section 76 is rendered conductive such that transistor Q23 is conductive, transistor Q14 will be rendered conductive and in its conductive condition will maintain transistor Q13 nonconductive even though the velocity signal at conductor 108 exceeds the determined magnitude. In this way the transistor Q13 and its inhibiting effect are maintained ineffective while the output section 76 is actuated.

As noted, the actuation of speed switch section 74 is also made a function of the $\mu$ of the surface by the $\mu$ detector section 58. This is done by varying the bias at the base of Q13 via conductor 129 such that for high $\mu$ surfaces Q13 will be rendered nonconductive for lower wheel speeds than for low $\mu$ surfaces. The $\mu$ detector section 58 functions in the manner to be described.

$\mu$ DETECTOR SECTION 58

In general the $\mu$ detector section 58 senses the $\mu$ of the surface by sensing the elapsed time that section 76 is actuated and provides an output signal at conductor 129 which varies in magnitude in accordance with variations in magnitude of this elapsed time. Note that the "on time" of section 76 is varied in accordance with the wheel spin-up rate as detected by spin-up section 56. Thus for a faster spin-up rate, indicative of a high $\mu$, section 76 will be deactuated sooner and the "on time" will be shorter than for a slower spin-up rate, indicative of a low $\mu$ surface. Thus, the "on time" will provide an indication of the $\mu$ of the surface. As will be seen, for longer on times (lower $\mu$) the signal from conductor 129 will bias Q13 such that it will be rendered nonconductive at high wheel speeds. Thus the $\mu$ detector section 58 prevents excessive wheel departures and enhances braking.

The $\mu$ signal at conductor 129 is transmitted from the collector of a PNP transistor Q23 which has its emitter connected to B plus line 92 via resistors R54, R55. The base of Q23 is biased via charge capacitor C23. A long time charge circuit is provided for capacitor C23 by resistors R56 and R57 connected as a voltage divider between the base and conductor 92 and the base and ground, respectively. The charge on capacitor is indicative of the elapsed actuation or on time of section 76 and hence provides the $\mu$ signal to Q23.

The capacitor C23 is charged via the potential at conductor 131 when Q23 is conducting (section 76 actuated) via the emitter-collector circuit of PNP transistor Q24. Q24 has its collector connected to C23 via diode CR23 and has its emitter connected to B plus line 92 via resistor R58 and regulator diode CR25 and connected to line 131 via resistor R58 and resistor R61. The base of Q24 is connected to ground via resistor R58. Thus when Q23 is conductive (section 76 actuated) Q24 will be rendered conductive via the potential at conductor 131 and capacitor C23 will charge to a potential determined by the elapsed time that Q23 (and hence Q24) is conductive. This charge on C23 is provided while section 76 is actuated and will be used to determine when actuation of section 76 will be initiated for the next cycle.

Since the charge on C23 is determined by the prior skid control cycle some means are required to provide some indication for the initiation of the first cycle at which time there is no $\mu$ history. This is done by the long time charge path defined by the voltage divider resistors R56, R57 such that prior to initiation of the first skid control cycle C23 will have a charge of a magnitude selected to represent an inbetween or medium $\mu$ condition.

The charge on C23 is changed for each cycle such that accurate $\mu$ information is provided. This is done by initially rapidly discharging C23 at the beginning of each actuation of section 76 Hence C23 will attain a new $\mu$ charge for each cycle. This is done by NPN transistor Q25 which has its collector connected to C23 via limiting resistor R65 and which has its emitter connected to ground. Thus when Q25 is rendered conductive C23 is rapidly discharged through its collector-emitter circuit. Q25 is normally nonconductive and will be rendered conductive upon an appropriate signal at the base. The base is biased from the potential at line 131 via the resistor R61 and fast charge network. The fast charge network will, upon initiation of conduction at conductor 131, turn Q25 on for a short time until the network charges at which time Q25 will cease to conduct. This permits rapid initial discharge of C23 such that it is in condition to receive the new $\mu$ charge. The fast charge network noted, includes a capacitor C24 connected from R61 to ground and a capacitor C25 connected from C24 to the base of Q25 via diode CR26 and resistor R64. Charge path resistors R62 and R63 are connected on opposite sides of diode CR26 and to ground. A discharge path resistor R60 connects C24 and C25 to ground via a diode CR24 and R58.

Thus the $\mu$ signal at conductor 129 will provide a signal having a magnitude varying in accordance with the $\mu$ of the surface.

SPIKE SUPPRESSOR SECTION 72

The section 72 comprises a diode CR30 and a Zener diode CR31 with the Zener CR31 having its cathode connected to ground and its anode connected to the anode of diode CR30 which in turn has its cathode connected to conductor 116. The spike suppressor section 72 removes transients which might inadvertently actuate valve 24.

IGNITION CYCLE SECTION 44

This section comprises an NPN transistor Q9 having its emitter connected to ground and its collector connected to the input of summing section 42, i.e., to the base of Q10. The base of Q9 is connected to ground via resistor R21 and to B plus line 92 via capacitor C15. The capacitor C15 has a fast charge time and when the circuit is energized as when the ignition is turned on a pulse is transmitted through C15 to momentarily turn Q9 on which momentarily turns Q10 on resulting in actuation of section 76 and cycling of the valve 24.

While it will be apparent that the preferred embodiment of the invention disclosed is well calculated to fulfill the objects above stated, it will be appreciated that the invention is susceptible to modification, variation and change without departing from the proper scope or fair meaning of the invention.

I claim:

1. In a skid control system for controlling fluid-pressure-actuated brakes of at least one wheel of a wheeled vehicle by controlling the fluid pressure to the brakes via a modulating valve actuated to one condition for relieving the fluid pressure and to another condition for applying the fluid pressure, the invention comprising: control circuit means for actuating the modulating valve to the one condition in response to an occurrence indicating an incipient skid condition, said control circuit means comprising first velocity means for providing a first velocity signal representative of the velocity of the vehicle and second velocity means for providing a second velocity signal representative of velocity of the wheel, and first means responsive to said first and second velocity signals for providing a first control signal and including means responsive to said first control system for preventing actuation of the valve to the one condition until said second velocity signal attains a selected first determinable magnitude indicative of a wheel speed less than vehicle speed with said first determinable magnitude varying with said first velocity signal.

2. The system of claim 1 with said first means providing said first control signal with said first determinable magnitude being varied such that said second velocity signal attains said first determinable magnitude at higher wheel speeds when said first velocity signal provides an indication of higher vehicle speeds.

3. The system of claim 2 with said occurrence being a deceleration of a second determinable magnitude.

4. The system of claim 3 with said control circuit means actuating the modulating valve to its other condition in response to a selected magnitude of a characteristic of said second determinable magnitude, said first velocity means increasing said selected magnitude in response to magnitudes of said second velocity signal representative of higher vehicle velocities.

5. The system of claim 1 with said control circuit actuating the valve to the other condition in response to an acceleration of the wheel of a third determinable magnitude.

6. The system of claim 5 with said first determinable magnitude being varied in accordance with the elapsed time that the valve is in the one condition.

7. The system of claim 6 with said first determinable magnitude being varied in accordance with said elapsed time such that said second velocity signal attains said first determinable magnitude at higher wheel speeds as said elapsed time is longer.

8. The system of claim 7 with said occurrence being a deceleration of a second determinable magnitude.

9. The system of claim 8 with said control circuit means actuating the modulating valve to its other condition in response to a selected magnitude of a characteristic of said second determinable magnitude, said first velocity means increasing said selected magnitude in response to magnitudes of said second velocity signal representative of higher vehicle velocities.

10. The system of claim 1 with said control circuit means responsive to a different occurrence for actuating the valve to the other condition and second means responsive to said first and second velocity means for providing a second control signal preventing actuation of the valve to the other condition until said second velocity signal attains a fourth determinable magnitude indicative of a wheel speed less than the vehicle speed less than the vehicle speed with said fourth determinable magnitude varying with said first velocity signal.

11. The system of claim 10 with said second means providing said second control signal with said fourth determinable magnitude being varied such that said second velocity signal attains said fourth determinable magnitude at a generally fixed increment from said first velocity signal.

12. The system of claim 11 with said different occurrence being an acceleration of the wheel of a third determinable magnitude.

13. The system of claim 12 with said first means providing said first control signal with said first determinable magnitude being varied such that said second velocity signal attains said first determinable magnitude at higher wheel speeds when said first velocity signal provides an indication of higher vehicle speeds.

14. The system of claim 13 with said occurrence being a deceleration of a second determinable magnitude, said control circuit means actuating the modulating valve to its other condition in response to a selected magnitude of a characteristic of said second determinable magnitude, said first velocity means increasing said selected magnitude in response to magnitudes of said second velocity signal representative of higher vehicle velocities, said control circuit actuating the valve to the other condition in response to an acceleration of the wheel of a third determinable magnitude, said first determinable magnitude being varied in accordance with the elapsed time that the valve is in the one condition, said first determinable magnitude being varied in accordance with said elapsed time such that said second velocity signal attains said first determinable magnitude at higher wheel speeds as said elapsed time is longer.

15. In a skid control system for controlling fluid-pressure-actuated brakes of at least one wheel of a wheeled vehicle by controlling the fluid pressure to the brakes via a modulating valve actuated to one condition for relieving the fluid pressure and to another condition for applying the fluid pressure, the invention comprising: control circuit means for actuating the modulating valve to the one condition in response to an occurrence indicating an incipient skid condition and first means responsive to indication of the velocity of the wheel and of the vehicle for preventing actuation of the modulating valve to the one condition for wheel speeds above a first determinable magnitude with said first determinable magnitude being higher for higher vehicle velocities whereby excessive wheel departure is inhibited.

16. The system of claim 15 with said first means responsive to an indication of the $\mu$ of the surface for decreasing said first determinable magnitude for higher $\mu$ surfaces.

17. The system of claim 16 with said control circuit means actuating the modulating valve to the other condition in response to a wheel acceleration of a third determinable magnitude and with the indication of the $\mu$ of the surface being derived as a function of the time elapsed between actuation of the valve to the one condition and to the other condition.

18. The system of claim 16 with said occurrence being deceleration of the wheel of a second determinable magnitude.

19. In a skid control system for controlling fluid-pressure-actuated brakes of at least one wheel of a wheeled vehicle by controlling the fluid pressure to the brakes via a modulating valve actuated to one condition for relieving the fluid pressure and to another condition for applying the fluid pressure, the invention comprising: control circuit means for actuating the modulating valve to the one condition in response to an occurrence indicating an incipient skid condition, and first means responsive to indications of the velocity of the wheel for preventing actuations of the modulating valve to the one condition for wheel speeds above a first determinable magnitude and responsive to an indication of the $\mu$ of the surface for decreasing said first determinable magnitude for higher $\mu$ surfaces.

20. The system of claim 19 with said control circuit means actuating the modulating valve to the other condition in response to a wheel acceleration of third determinable magnitude and with the indication of the $\mu$ of the surface being derived as a function of the time elapsed between actuation of the valve to the one condition and to the other condition.

21. The system of claim 20 with said control circuit means including charge storage means with the magnitude of charge varying with the magnitude of said elapsed time.

22. The system of claim 21 with said control circuit means including discharge means for rapidly discharging said storage means after actuation of the valve to the one condition whereby the magnitude of charge can be reset to provide a new indication of $\mu$ of the surface for each cycle.

23. The system of claim 22 with said control circuit means including charge means actuatable prior to the first actuation of the valve to the one condition for providing an initial charge on said storage means indicative of a medium $\mu$ surface.

24. In a skid control system for controlling fluid-pressure-actuated brakes of at least one wheel of a wheeled vehicle by controlling the fluid pressure to the brakes via a modulating valve actuated to one condition for relieving the fluid pressure and to another condition for applying the fluid pressure, the invention comprising: control circuit means for actuating the modulating valve to the one condition in response to an occurrence indicating an incipient skid condition and actuating the modulating valve to the other condition in response to a different occurrence indicating termination of the skid condition and first means responsive to indications of the velocity of the wheel for preventing actuation of the modulating valve to the other condition for wheel speeds below a first determinable magnitude.

25. The system of claim 24 with said first means responsive to indications of the velocity of the vehicle with said first determinable magnitude being generally a fixed increment less than the velocity of the vehicle.

26. The system of claim 25 with said occurrence being a deceleration of the wheel of a determinable magnitude and with said different occurrence being an acceleration of the wheel of a different determinable magnitude.

27. In a skid control system for controlling fluid pressure actuated brakes of at least one wheel of a wheeled vehicle by controlling the fluid pressure to the brakes via a modulating valve actuated to one condition for relieving the fluid pressure and to another condition for applying the fluid pressure, the invention comprising: control circuit means for actuating the modulating valve in response to predetermined occurrences including an indication of vehicle velocity, first means providing said indication as a magnitude of vehicle velocity as a function of the magnitude of elapsed time of the valve being in the one condition.

28. The system of claim 27 with said first means comprising storage means and comprising second means for initially providing a charge to said storage means indicative of the speed of the wheel and for preventing discharging of said storage means during said elapsed time.

29. The system of claim 28 with said second means discharging said storage means at a rate exceeding the deceleration rate of the vehicle and generally maintaining the charge on said storage means when the valve is in the one condition.

30. The system of claim 29 with said control circuit means responsive to an indication of the $\mu$ of the surface for providing a decrease in said elapsed time with an increase in $\mu$.

31. The system of claim 30 with said control circuit means including second means for controlling actuation of the valve to the other condition as a function of wheel spin-up.

UNITED STATES PATENT OFFICE
CERTIFICATE OF CORRECTION

Patent No. 3,578,819     Dated    May 18, 1971

Inventor(s)    Thomas M. Atkins

It is certified that error appears in the above-identified patent and that said Letters Patent are hereby corrected as shown below:

Column 3, line 32 "driven" should be --driver--;
Column 4, line 7, "an" should be --and--; Column
10, line 45, "-following" should be --follower---:
Column 12, line 54, "in" should be --is--; Column 12,
line 57 "discharge" should be --charge--; Column
14, line 22, "48a" should be --50a--; Claim 1,
Column 18, line 43, "system" should read --signal--;
Claim 10, column 19, line 14, after "speed"
insert --of a selected magnitude--, line 15, delete
"less than the vehicle speed."

Signed and sealed this 25th day of December 1973.

(SEAL)
Attest:

EDWARD M. FLETCHER, JR.        RENE D. TEGTMEYER
Attesting Officer             Acting Commissioner of Patents